May 21, 1940.     J. M. BING     2,201,606
AUTOMATIC EXPOSURE CONTROL
Filed March 6, 1939     2 Sheets-Sheet 1
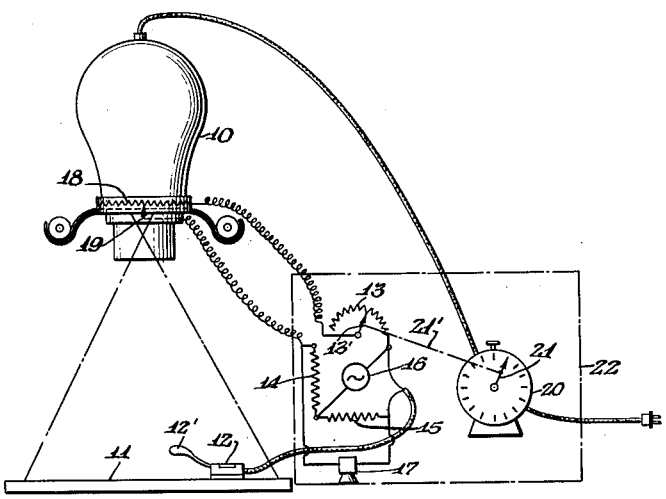
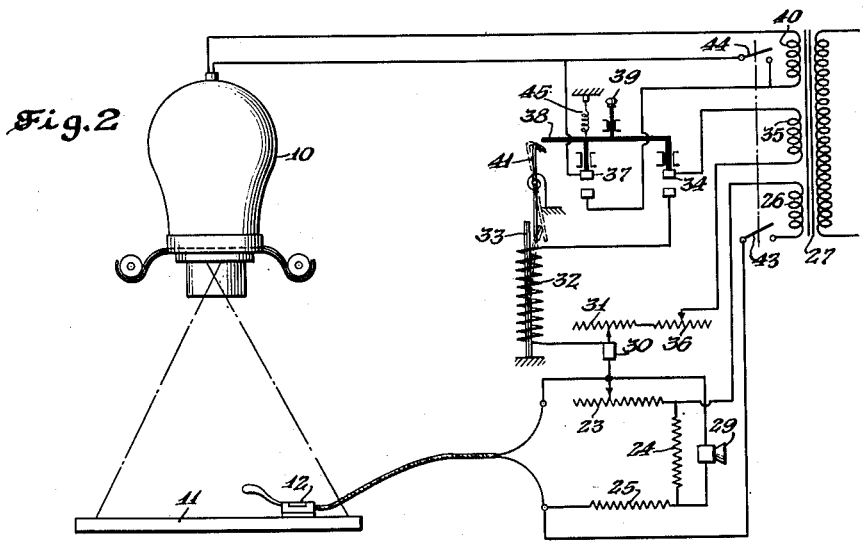
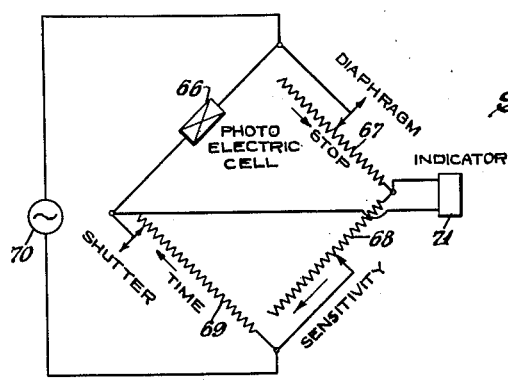
INVENTOR.
Joseph M. Bing
BY
ATTORNEY.

May 21, 1940.                J. M. BING                2,201,606
                    AUTOMATIC EXPOSURE CONTROL
                Filed March 6, 1939        2 Sheets-Sheet 2
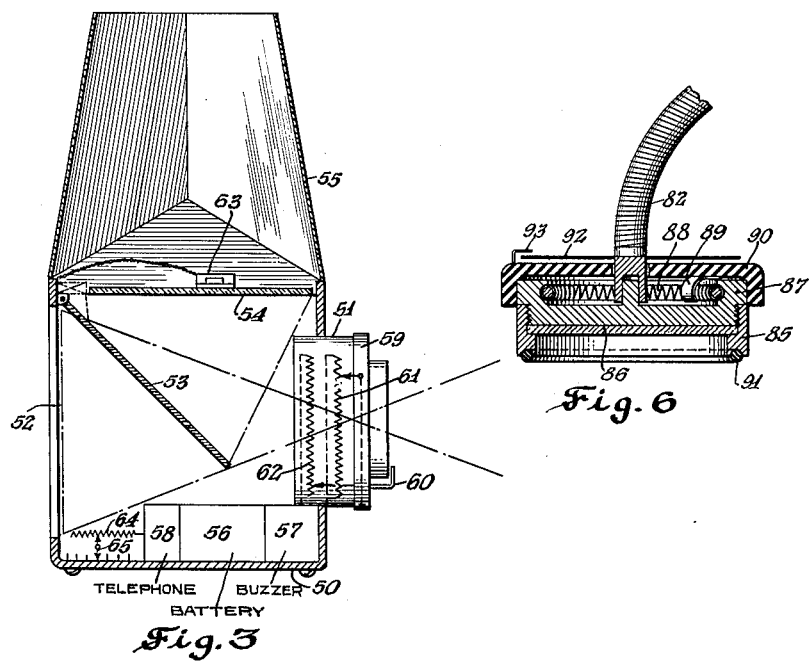
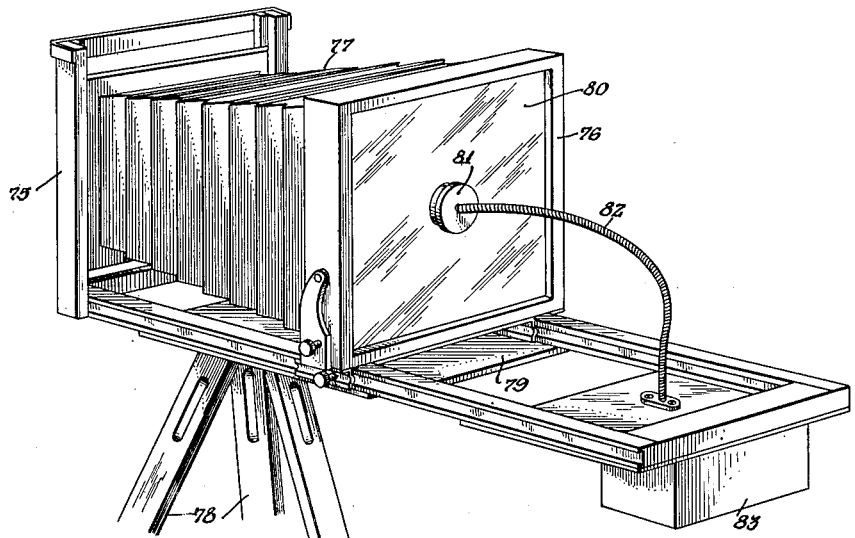
INVENTOR.
Joseph M. Bing
BY
ATTORNEY.

Patented May 21, 1940

2,201,606

UNITED STATES PATENT OFFICE 2,201,606

AUTOMATIC EXPOSURE CONTROL

Joseph M. Bing, New York, N. Y.

Application March 6, 1939, Serial No. 260,082

5 Claims. (Cl. 88—23)

The present invention relates to photography and more particularly to apparatus for and a method of automatic exposure control in taking a photograph or in printing and enlarging or the carrying out of any other photographic reproduction process.

This application is a continuation in part of my copending patent application entitled Photometer, filed February 26, 1938, Patent No. 2,149,250 of March 7, 1939.

In said copending application I have described apparatus for determining and/or automatically securing the correct exposure in photographic apparatus comprising essentially a photoelectric device capable of producing an electric current of varying intensity in proportion to the scene brightness of a photographic object or scene or the density of a negative, a variable compensating impedance for adjusting the intensity of said current to a predetermined value including zero, and a member operatively connected to said compensating impedance whose position in the compensating or balancing condition indicates or serves to directly effect the proper exposure setting to secure a correctly exposed negative or print. According to the improvements disclosed there are provided further means including an audible signaling device for acoustically indicating the balancing position of said compensating impedance, thereby, among other advantages, relieving the photographer from visual adjustments of the exposure control elements and enabling his full attention to be given to the pictorial rendering of an image or scene to be reproduced. This audible determination or control of the correct exposure evidently has special advantages in printing and enlarging when working in a dark room.

An object of the present invention is to provide improved means for and a method of automatic exposure control utilizing a balancing device to adjust the photoelectric current representative of the scene brightness or negative density to a predetermined value including zero.

A further object is to provide automatic exposure control apparatus which is operated exclusively acoustically and electrically and is therefore operated with a minimum of manipulations to be performed by the photographer.

A more specific object is the provision of mechanism in connection with a photoelectric device capable of producing an electric current responsive to scene brightness or negative density which itself determines the correct time of exposure by automatically setting the correct shutter speed in a camera or shutting off the light in a printer or enlarger when the correct exposure has been given while also making allowance for film or paper speed, lens opening and other factors determining the character of the final negative or print.

The above and further objects and aspects of the invention will become more apparent from the following detailed description taken with reference to the accompanying drawings forming part of this specification and wherein:

Figure 1 illustrates schematically an automatic exposure control system for obtaining a properly dosed exposure in operating a photographic enlarger, Figure 2 is a modification of apparatus shown in Figure 1 employing purely electrical means for its operation, Figure 3 illustrates the improvement of the invention incorporated in a camera of the reflex type, Figure 4 is a fractional view showing a modification of the balancing circuit embodied in Figure 3, and Figures 5 and 6 illustrate a further application of the invention as embodied in a view or studio camera.

Similar reference characters identify similar parts throughout the different views of the drawings.

Referring more particularly to Figure 1, I have schematically shown an enlarging apparatus of the standard vertical type comprising a housing 10 for the usual source of illumination such as an electric bulb, the lens and focusing mechanism and a base board or easel 11 upon which the image on the negative plate or film is projected to affect the sensitive paper in a manner well known. Item 12 represents a photoelectric cell, in the example shown a cell of the variable resistance type, mounted in a casing having an extending handle 12' or the like for conveniently placing the cell over a pictorially important part of the projected negative image selected for determining the exposure. The cell 12 is provided with flexible conducting leads and arranged to form one arm of a balancing bridge circuit completed by a further variable balancing or compensating resistance 13 and a pair of fixed resistances 14 and 15 forming the remaining bridge arms. At 16 I have shown a source for supplying an alternating current having a frequency in the audible range, such as a current directly derived from an existing alternating current house lighting system or a current produced by a separate generator such as a buzzer etc. The source 16 is connected to one pair of diagonal terminals of the bridge and item 17 represents an audible signaling device such as a telephone or loudspeaker connected to the remaining bridge terminals to be operated by the source 16 in the unbalanced condition of the bridge circuit.

In the example illustrated I have provided in series with the balancing resistance 13 a further variable resistance 18 having a movable contact member 19 operatively connected with the adjustable diaphragm of the enlarger serving to control the amount of light passing through the lens or the average density of the negative image projected upon the easel 11. With a certain setting of the diaphragm or value of the resistance 18, the positions of the variable member 13' of the balancing resistance 13 in the balancing condition will be characteristic of the negative density or image brightness scanned by the photoelectric device 12. In order to effect an automatically dosed exposure for any image brightness scanned, I have provided an exposure timing device in the form of a clockwork operated time switch 20 adapted to connect the electric current feeding the illuminating source in the enlarger by pressing a lever or button for a definite time interval which may be set by an adjustable member 21, the latter being operatively connected with the adjustable member 13' of the balancing resistance 13 as indicated at 21'. In this manner it is possible by proper design and adjustment of the several elements, to automatically set the proper exposure time for any negative density, taking also into consideration the varying adjustments of the lens diaphragm opening. The latter may also serve to make allowance for different sensitivities of the enlarging paper used. Alternatively a further variable resistance may be provided in series with the balancing resistance 13 having a displaceable member cooperating with a scale calibrated in relative degrees of paper sensitivity.

Referring to Figure 2, I have shown an exposure control apparatus similar to Figure 1 embodying a purely electrically operated exposure timing system and adapted for direct operation from an A. C. power or lighting net-work. I have shown a balancing bridge comprising the photoelectric cell 12, a variable balancing resistance 23 and a pair of fixed resistances 24 and 25. As a source of alternating current I have provided in the example shown the secondary winding 26 of a transformer 27 whose primary may be connected to an existing alternating current house lighting circuit. The secondary 26 is connected to one pair of diagonal terminals of the bridge, the sound reproducer 29 being connected to the remaining bridge terminals similar as in the preceding figure. The balancing resistance has an adjustable member 30 which also serves as the adjustable member for the variable resistance 31 in a thermostatic exposure timing circuit. The latter comprises further a heater winding 32 surrounding a bi-metallic strip 33, the contacts 34 of a manually operated exposure switch, a further secondary winding 35 of the feeding transformer and an additional adjustable resistance 36. The exposure switch comprises a further pair of cooperating contacts 37, both pairs of contacts 34 and 37 being simultaneously operable by the aid of a common supporting member or bar 38 by means of a push button or the like shown at 39. The contacts 37 are arranged in the illuminating circuit for the enlarger connected to a third secondary winding 40 of the feeding transformer. I have further provided a spring urged catch 41 cooperating with the exposure switch 38, 39.

The operation of the system shown in Figure 2 is as follows:

After placing the photoelectric cell 12 over a desired portion of the projected image on the easel 11 and effecting a balance of the bridge circuit as ascertained by the cessation of the sound signal produced by the telephone or loudspeaker 29, the member 30 will assume a position depending on the existing image brightness or negative density scanned and accordingly the timing resistance 31 will be set to a corresponding value. During this operation a testing button is pressed closing a pair of ganged switches 43 and 44 to supply current to the bridge circuit and to light the enlarger bulb. After the balancing operation is completed the switches 43 and 44 are opened and a piece of enlarging paper placed upon the easel 11. By then pressing the exposure switch knob 39 contacts 34 and 37 will be brought into engagement, thus closing both the timing circuit and the lighting circuit for the enlarger bulb fed from the secondaries 35 and 40, respectively. The switch will be held in the closed position by the catch 41 against the tension of a spring 45.

The current flowing through the timing circuit will heat the bi-metallic element 33 due to eddy currents induced therein through the winding 32 in such a manner that after lapse of a predetermined time defined by the current strength, the element 33 fixedly mounted at one end will have sufficiently bent to trip the catch 41 and release the switch through the action of the spring 45. Since the timing current is determined by the value of the resistance 31, it is seen that the exposure time is definitely related to the illumination of the photoelectric cell or negative density thereby enabling the system to be designed so as to effect an automatically dosed correct exposure without requiring any guesswork or testing experiments, resulting in substantial saving of both time and material.

In order to take into consideration various paper of different sensitivity the addtional resistance 36 in the timing circuit may be adjusted according to the selected type of paper, while in case of enlargers with variable lens diaphragm the different openings of the latter may be taken care of in the manner described in connection with Figure 1. Additional factors besides the exposure time may also be included in the control by adjusting one or more of the additional resistances completing the bridge circuit, as shown in Figure 4 to be described later.

Referring to Figure 3 I have shown an exposure control system according to the invention embodied in a photographic camera of the reflecting type although not limited to such cameras as will become evident. The camera shown schematically comprises a casing 50 having the usual objective, diaphragm and shutter mechanism collectively indicated at 51, mounted in its front wall, means for holding the film or plate 52, a movable reflecting mirror 53, a ground glass or viewing screen 54 and a collapsible ground glass hood 55. Suitably mounted at the bottom of the casing 50 where usually sufficient space is available are a battery 56 of the small flash light type serving to energize a sound generator 57 such as a small buzzer, and a telephone 58. The shutter speed setting ring 59 and the diaphragm adjusting lever 60 are each operatively connected with the displaceable member of a variable resistance 61 and 62, respectively, both resistances being arranged in series and forming the balancing arm of the bridge circuit similar to the resistances 13 and 18 in Figure 1. The bridge is completed by two further resistances, (not shown) suitably mounted within the camera casing and connected with the A. C. generator, photoelectric cell and reproducer in substantially the same manner as described in connection with the preceding illustrations. The photoelectric cell 63 is normally placed next to the ground glass 54 at a suitable space provided therefor as indicated in dotted lines and moved to the pictorially important part of the ground glass image when carrying out an adjusting operation. The arrangement may be such that either the shutter speed may be selected as desired and the diaphragm adjusting member displaced until obtaining a balance or vice versa the diaphragm may be first selected to suit existing requirements and the correlated shutter speed set to the proper value by the balancing operation. In order to take into consideration varying film or plate speeds an additional resistance 64 may be provided in the balancing bridge arm having an adjustable member 65 operable from the outside of the camera casing and arranged to cooperate with a scale calibrated in suitable film or plate speed units.

According to a modification, diaphragm, shutter and film speed factors may all be represented by variable resistances forming the arms of the balancing bridge as shown in Figure 4. In the latter numeral 66 represents the photoelectric cell, and 67, 68 and 69 are variable resistances forming the remaining bridge arms and being calibrated or operatively connected to various exposure control elements of a camera or the like and relatively variable as indicated by the arrows in the drawing. In the example shown resistance 67 corresponds to variable diaphragm openings and may be calibrated or directly operatively connected with a diaphragm adjusting member as indicated. Resistance 69 corresponds to exposure times and may be connected with an exposure setting member, while resistance 68 is arranged to cooperate with a scale calibrated in film or plate speed units. In this manner all four major exposure determining factors viz. scene brightness expressed by the resistance of the photoelectric cell 66, diaphragm opening or "stops" represented by the value of resistance 67, shutter speed represented by the value of the resistance 69 and film sensitivity corresponding to the resistance 68, all contribute singly and collectively to the balance or unbalance of the bridge circuit, whereby any one or more factors may be selected to satisfy individual requirements or desires and the remaining factor adjusted to the proper value by balancing the bridge circuit in the manner described in order to secure a correctly exposed negative or print. The photoelectric cell and indicator are shown at 70 and 71, respectively, and may be of similar type as shown in the previous illustrations.

Referring to Figure 5 I have illustrated an embodiment of the invention incorporated in a so-called view camera comprising in a known manner a front 75 carrying the lens and shutter mechanism and connected to a back 76 through a collapsible bellows 77, both said front and back being relatively slidably mounted upon a base 79 by means of suitable guide and locking elements in a manner well understood and as shown in the drawing. Item 80 represents a ground glass upon which a real image of the object or scene to be photographed is formed by the lens and which after adjustment and correct focusing is replaced by a sensitive plate to be exposed by means of the shutter to form a latent image thereon. The photoelectric cell 81 is connected to the base 79 through a flexible member 82 preferably of the so-called "goose neck" or self-supporting type adapted to stay in any shape or position to which it has been bent and comprising essentially a spirally wound tape or band forming a hollow tube through which the electrical connecting leads to the photocell are passed. In this manner the photocell may be positioned against any desired portion of the ground glass image selected for the determination of the exposure data. The remaining elements of the exposure control system i. e. the balancing resistance, the fixed resistors, the current source and the indicating or signaling device etc. are suitably housed in a box or casing 83 mounted on the underside of the base 79.

The control of the exposure may be fully automatic as described herein above or manual by the provision of an indicating scale or calculating device operatively connected with the adjustable member of the balancing resistance as described in my above mentioned parent application. For the latter purpose a preferred construction as shown in Figure 6 comprises a balancing resistance 88 structurally combined with the photoelectric cell and mounted upon a common support or casing the latter also carrying an indicating scale or mechanical converting device whereby all that is necessary to make a measurement is to place the cell casing against the ground glass as shown in Figure 5 and to turn the balancing resistance until a balance is effected. The proper exposure data may then be directly read from the indicating scale on the top of the photocell casing.

As shown in Figure 6 the combined photocell and balancing device comprises a first ring shaped member 85 having a shoulder for supporting the photoelectric cell 86, a second top member 87 screwed on to the member 85 to hold the cell firmly in place. The member 87 has a recess wherein there is mounted a circular variable resistance 88 comprising a slidable contact 89 carried by a rotatable cup-shaped top member 90. In order to prevent the device from sliding upon the ground glass when rotating the member 90 during adjustment of the balancing resistance I have provided suitable friction means such as a rubber ring 91 placed in a groove in the lower surface of the member 85. By slightly pressing the device against the ground glass there is thus produced sufficient friction to prevent slipping during rotation of the top member 90. Both the connecting leads to the photocell and to the balancing resistance are passed through the flexible tube 82 to the remaining apparatus housed in the casing 83. I have further shown an adjustable fixed scale member 92 arranged to cooperate with an index member 93 carried by the adjustable member 90 for direct indication of the proper exposure data such as lens opening or shutter speed after completion of a balancing operation, thereby enabling an exposure determination to be carried out by a single manipulation in an easy and simple manner.

It will be evident from the above that the invention is not limited to the specific arrangements and embodiments shown herein for illustration but that the underlying principle and inventive concept are susceptible of numerous modifications and variations coming within the broad scope and spirit of the invention as expressed in the appended claims. Thus the bimetallic element in the timing circuit may be heated by directly passing the electric current through it in place of the inductive heating as provided in the exemplification shown. Moreover any other electric timing method may be employed such as based upon the charge or discharge of an electric condenser arranged in series with a variable timing resistance operatively connected with the balancing impedance in a manner well understood from the above.

I claim:

1. The combination with a protographic printer comprising an electric light source, a negative and a printing paper holder, of a photoelectric cell capable of producing an electric current in proportion to the intensity of light striking the same, said cell being arranged to be affected by light passing said negative, a balancing impedance having an adjustable member arranged to compensate the effect of the current produced by said cell, audible signaling means adapted to be controlled by the current produced by said cell for acoustically ascertaining the balancing condition, electric exposure timing means having an adjustable timing resistance for controlling the connection and disconnection of said light source to affect an exposure of said printing paper, and an operative connection between the adjustable members of said balancing resistance and said exposure timing resistance.

2. An arrangement as claimed in claim 1 wherein said photoelectric cell is of the variable resistance type and forms one arm of a bridge circuit with said balancing impedance constituting another arm of said bridge and a pair of further impedances completing the bridge circuit, and wherein said signaling means is an electric sound generator capable of transforming alternating currents into corresponding sound variations and connected to one pair of diagonal terminals of said bridge, and a source of alternating current having a frequency in the audible range connected to the remaining bridge terminals.

3. An arrangement as claimed in claim 1 wherein said exposure timing means comprises an exposure switch for said light source, an auxiliary electric circuit including a thermostatic element heated by the current traversing said circuit and said timing resistance, means for simultaneously closing said auxiliary circuit by said exposure switch, and further means for opening said exposure switch by said thermostatic element after a time lapse upon closing the switch determined by the current through said auxiliary circuit.

4. An arrangement as claimed in claim 1 comprising a further variable resistance in series with said balancing impedance to be adjusted according to the value of an additional exposure controlling magnitude.

5. The combination with a photographic printer comprising an electric light source, a negative and a printing paper holder, of a balancing type photometer for measuring the brightness of the image projected upon the paper holder by the negative, said photometer comprising an electric balancing resistance having an adjustable member the position of which is representative of the image brightness in the balance position, exposure timing means comprising an exposure switch for said light source, an auxiliary electric circuit including a current source, a thermostatic element and a variable timing resistance having an adjustable member, an operative connection between the adjustable members of said balancing resistance and said timing resistance, means for simultaneously closing said auxiliary circuit by said exposure switch, and further means for opening said exposure switch by said thermostatic element after a time lapse after closing the switch determined by the current through said auxiliary circuit.

JOSEPH M. BING.